Nov. 21, 1944. V. E. SPROUSE 2,363,206

TIE FOR HOSE CLAMPS

Filed Feb. 4, 1944

INVENTOR,
Verner E. Sprouse,
By Herbert A. Minturn
Attorney.

Patented Nov. 21, 1944

2,363,206

UNITED STATES PATENT OFFICE 2,363,206

TIE FOR HOSE CLAMPS

Verner E. Sprouse, Columbus, Ind.

Application February 4, 1944, Serial No. 521,016

4 Claims. (Cl. 24—19)

This invention relates to hose clamps and particularly to clamps intended for use on large diameter hose. The invention further relates to that type of clamp wherein there is a single metal band, a portion of which is reduced in width to pass through a slot in another portion of the band to permit wrapping of the band about the hose and maintaining a substantially continuous contact of the band around the hose.

Figure 1:
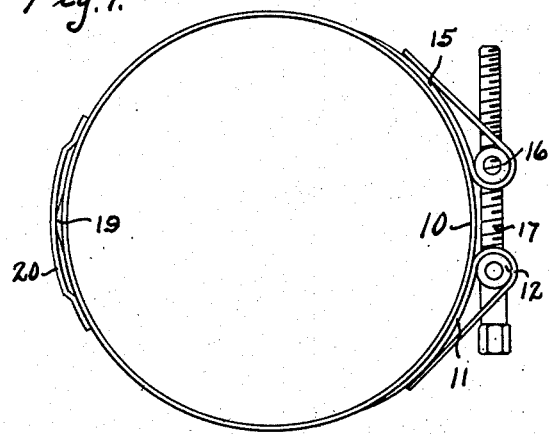
Figure 2:
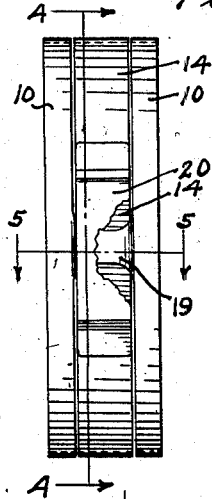
Figure 3:
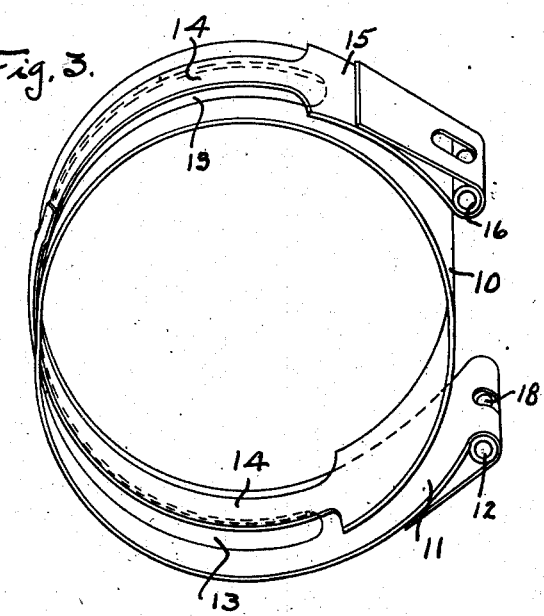
Figure 4:
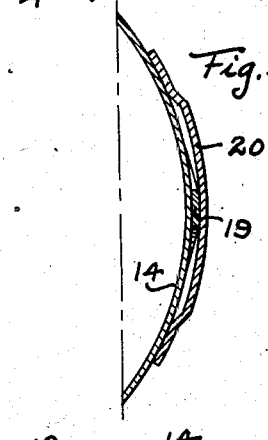

A primary object of the invention is to maintain divided portions of the band in side by side fixed relation by an exceedingly simple and effective tie permitting relative longitudinal or circumferential shifting between the band parts. Other important objects and advantages of the invention will become apparent to those versed in the art in the following description of one particular form of the invention as illustrated in the accompanying drawing, in which Fig. 1 is a view in edge elevation of a clamp structure embodying the invention;

Fig. 2, a view in outside elevation partly broken away;

Fig. 3, a view in perspective of the clamp structure with the clamping bolt removed and the clamp in an expanded state;

Fig. 4, a detail in section on the line 4—4 in Fig. 2; and

Figure 5:
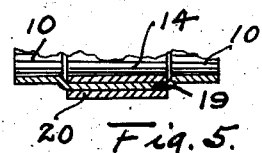

Fig. 5, a detail in section on the line 5—5 in Fig. 2.

Like characters of reference indicate like parts throughout the several views in the drawing.

A band, generally designated by the numeral 10, is formed to have a terminal end 11 carrying any suitable bolt engaging device, herein shown as a cylinder 12 around which the end 11 is wrapped to extend over and against the outer face of the end portion 11 and be secured thereto by any suitable means, such as by welding. Starting from this terminal end 11 and preferably spaced from the welding zone just indicated is a slot 13. Then the band 10 continues in its full width from the end of that slot 13 around inside of the terminal end 11.

A tongue 14 continues integrally from this portion of the band 10 and is formed to have a width that will permit it to pass through the slot 13 with the inner and outer faces of the tongue 14 maintained in parallel alignment with the faces of that part of the band 10 extending laterally from each side of the slot 13. This tongue 14 is inserted through the slot 13 from the inside of the band and is carried on out and around to have a terminal end 15 overlapping the outside of the band 10 to extend over that portion of the band 10 which lies between the respective ends of the slot 13.

This terminal end 15 is preferably of the same width as that of the band 10 and is formed in the same manner as the other terminal end 11 by having the end wrap around a cylinder 16 and be carried around back on its outer face to be welded thereto. A bolt 17 is revolubly passed transversely through a hole 18 in the cylinder 12 (the terminal end 11 being cut away around the cylinder to permit insertion of the bolt 17 therethrough) and the bolt is screw-threadedly engaged through the cylinder 16 (the terminal end 15 being cut away to permit the passage of the bolt through the cylinder 16).

The width of the tongue 14, Fig. 2, will normally approximate twice the width of that portion of the band 10 lying on each side of the slot 13. Therefore when the clamp is used for large diameter hose, and the clamp is made out of light gauge metal, there would be a tendency, particularly in shipping and handling for the parts of the band on each side of the slot 13 to become spread apart or pushed in, in overlapping relation, from or over the tongue 14, resulting in difficulty and time consuming operations on the part of the workman in attempting to install the clamp on the hose in production work. One particular present use of the clamp and structure forming the present invention is on a hose having approximately a five inch diameter. It is to be understood, of course, that the clamp is adaptable for use on hose having a wide range of diameters.

To prevent displacement of the clamp band portions, as above indicated, a tie 19 is carried across the slot 13 to interengage the parts of the band 10 on each side of that slot. In the present form, this tie 19 is in integral part of the band 10. This tie 19 is carried across between those parts of the band 10 to have its inner face in a plane sufficiently spaced outwardly from the plane of the inner faces of those band parts so as to permit the tongue 14 to pass across inside of the tie 19 and by the tie 19 maintain the inner face of the tongue 14 in the plane of the faces of those band parts.

Then in order to prevent inward displacement of the tongue 14 relative to those band parts on each side of the slot 13, a strap 20 is secured across the outside of the tie 19 by having its ends attached to the tongue 14 in spaced relation from each edge of the tie 19. The ends of the strap 20 are offset in order to space the major length of the strap 20 from the outer surface of the tongue 14 to give that clearance which will permit the tie 19 to slide freely therebetween. Furthermore, the ends of the strap 20 are spaced apart a sufficient distance to permit circumferential travel of the tongue 14 relative to the tie 19 which is required in drawing the strap ends 11 and 15 one toward the other in the clamping action to reduce the effective internal diameter of the clamp.

By use of the interengaging structure described, the clamp in its larger sizes is effectively maintained to have its proper band width throughout its circumference and furthermore, there is eliminated the possibility of clamps becoming intertwined one with another in storage and in shipping. Also it is to be observed that the internal face of the clamp is maintained without the presence of any inwardly protruding parts which would interfere with the clamping action or which would dig into and distort the hose being clamped. Furthermore, the external side of the clamp is also left without any protruding members that would engage the operator's hands or clothing during and after the clamping action.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. A hose clamp comprising a band having a longitudinal slot through a length thereof; a reduced width portion of the band beyond said slot forming a tongue; said band and tongue being rolled and lapped upon itself to have the tongue carried from the inside to the outside of the band through said slot; a terminal clamp end on each end of said band; means for pulling said ends one toward the other to set up circumferential, relative travel between said tongue and the balance of said band; and a tie across said slot interconnecting the band portions on each side thereof, said tie being offset from said portions to pass across the outer side of said tongue to position the inner side of the tongue in substantially the same plane as that of the inner sides of said portions.

2. A hose clamp comprising a band having a longitudinal slot through a length thereof; a reduced width portion of the band beyond said slot forming a tongue; said band and tongue being rolled and lapped upon itself to have the tongue carried from the inside to the outside of the band through said slot; a terminal clamp end on each end of said band; means for pulling said ends one toward the other to set up circumferential, relative travel between said tongue and the balance of said band; and a tie across said slot interconnecting the band portions on each side thereof, said tie being offset from said portions to pass across the outer side of said tongue to position the inner side of the tongue in substantially the same plane as that of the inner sides of said portions; and a strap secured by its ends to the outer said of said tongue to extend slidingly over said tie, said strap ends being normally spaced from said tie.

3. A hose clamp comprising a band having a longitudinal slot through a length thereof; a reduced width portion of the band beyond said slot forming a tongue; said band and tongue being rolled and lapped upon itself to have the tongue carried from the inside to the outside of the band through said slot; a terminal clamp end on each end of said band; means for pulling said ends one toward the other to set up circumferential, relative travel between said tongue and the balance of said band; and a tie across said slot interconnecting the band portions on each side thereof, said tie being offset from said portions to pass across the outer side of said tongue to position the inner side of the tongue in substantially the same plane as that of the inner sides of said portions; and a strap secured by its ends to the outer side of said tongue to extend slidingly over said tie, said strap ends being normally spaced from said tie; said tie being located at substantially the longitudinal center of said slot, and said band portions each being approximately half the width of said tongue.

4. In a hose clamp, the combination with a band having a longitudinal slot through a length thereof; a reduced width portion of the band beyond said slot forming a tongue; said band and tongue being rolled and lapped upon itself to have the tongue carried through from the inside to the outside of the band through said slot; and band end engaging means to set up circumferential travel of the overlapping band parts; of a tie across said slot spacing the band portions on each side thereof a distance substantially equal to the width of said tongue; and means interengaging said tongue and said tie to permit circumferential travel therebetween but to limit radial travel of the tongue from the tie; said tie being externally of said tongue.

VERNER E. SPROUSE.